United States Patent [19]
Kuhn et al.

[11] 3,896,941
[45] July 29, 1975

[54] MULTISTORY BUILDING WITH A MATERIAL HANDLING ELEVATOR APPARATUS HAVING FIXED AND MOVABLE TRACKS

[76] Inventors: Jorg Kuhn, Alpsteinstrasse 56, Herisau, Switzerland; Elmar Sohm, Vorarlberg, Lauterach, Austria

[22] Filed: May 18, 1972

[21] Appl. No.: 254,556

Related U.S. Application Data

[60] Division of Ser. No. 197,432, Nov. 10, 1971, Pat. No. 3,717,953, and a continuation-in-part of Ser. No. 4,918, Jan. 22, 1970, abandoned.

[52] U.S. Cl. ........... 214/16.4 A; 214/16.4 C; 47/1.1; 214/730
[51] Int. Cl. .............................................. B65g 1/06
[58] Field of Search .......... 214/16.4 A, 730, 16.4 C; 47/1.1

[56] References Cited
UNITED STATES PATENTS

| | | | |
|---|---|---|---|
| 1,903,274 | 3/1933 | Watson | 214/16.4 A |
| 2,948,421 | 8/1960 | Smith et al. | 214/16.1 EB |
| 3,255,499 | 6/1966 | Crowell et al. | 214/711 |
| 3,351,219 | 11/1967 | Ruderfer | 214/16.4 A |
| 3,428,195 | 2/1969 | Pamer | 214/16.4 A |
| 3,511,389 | 5/1970 | Carter | 214/16.1 CE |
| 3,608,750 | 9/1971 | Young | 214/16.4 A |
| 3,610,445 | 10/1971 | Kitchen | 214/16.4 A |
| 3,674,159 | 7/1972 | Lemelson | 214/16.4 A |

FOREIGN PATENTS OR APPLICATIONS

| | | | |
|---|---|---|---|
| 253,424 | 4/1963 | Australia | 214/16.1 CC |
| 276,409 | 12/1968 | Austria | 214/16.1 CC |
| 2,001,360 | 7/1970 | Germany | 47/1.1 |
| 416,781 | 9/1934 | United Kingdom | 214/16.1 EB |

*Primary Examiner*—Robert J. Spar
*Assistant Examiner*—R. B. Johnson
*Attorney, Agent, or Firm*—Seidel, Gonda & Goldhammer

[57] ABSTRACT

This invention relates to elevator apparatus adapted to elevate receptacles stacked on one another and located in air-conditioned chambers. The elevator apparatus and a horizontally movable processing line are arranged for cooperation in processing receptacles from a plurality of said chambers which are disposed parallel to one another.

5 Claims, 4 Drawing Figures

PATENTED JUL 29 1975　　　　　3,896,941

SHEET 1

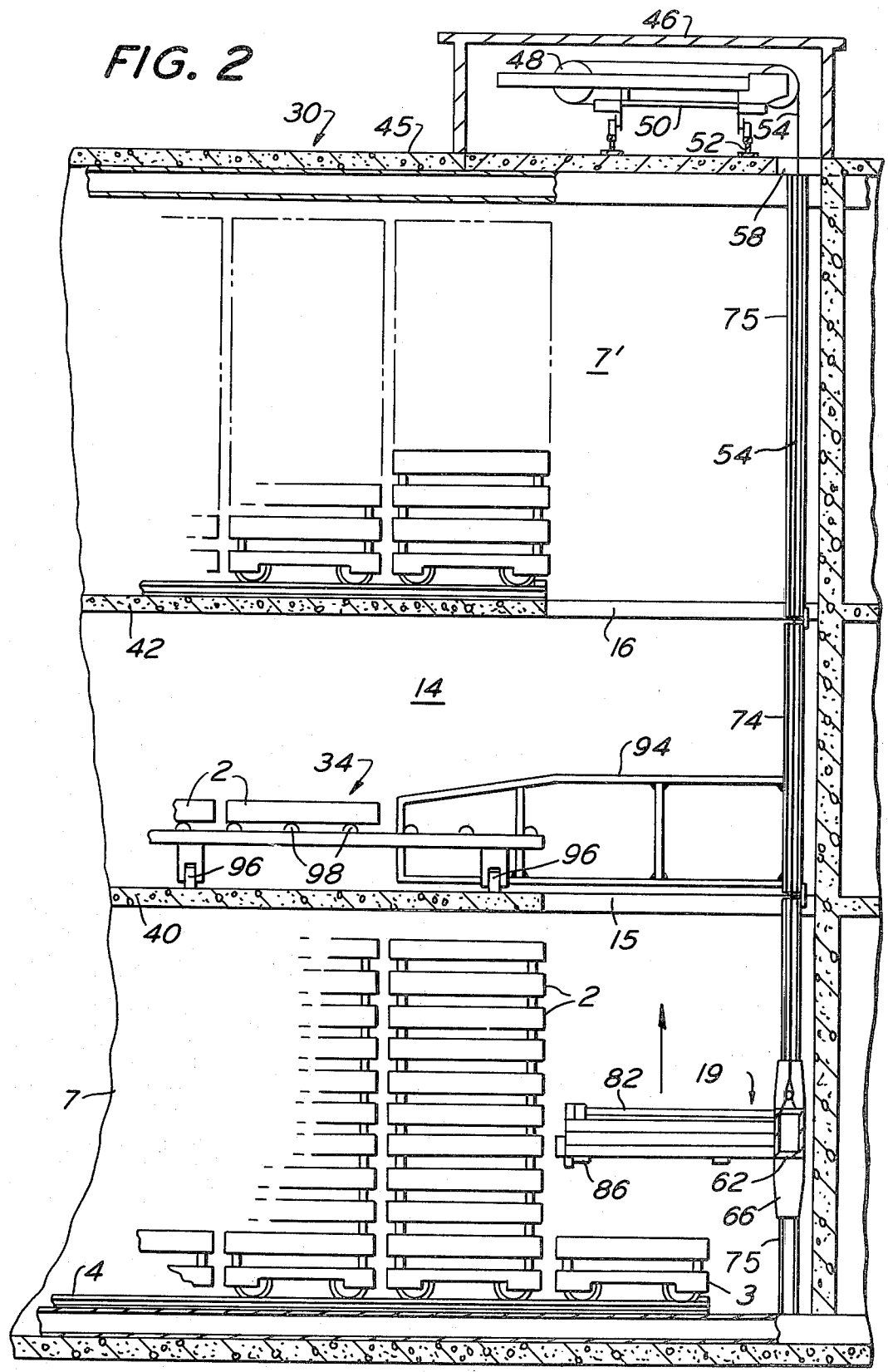

MULTISTARY BUILDING WITH A MATERIAL HANDLING ELEVATOR APPARATUS HAVING FIXED AND MOVABLE TRACKS

This application is a Division of our copending application Ser. No. 197,432, filed on Nov. 10, 1971. Now U.S. Pat. No. 3,717,953 which was a C.I.P. of application Ser. No. 4,918 filed on Jan. 22, 1970 which is now abandoned.

In the environment particularly adapted to use the present invention, trays or receptacles of plants such as mushrooms are stacked in elongated air-conditioned chambers having oppositely disposed walls spaced from one another. The distance between the walls, when having a stack of trays therebetween and from floor to ceiling, precludes the entry of a person therebetween. Inlet and outlet openings are provided adjacent the ends of each chamber. The trays are removed from their chamber by a gripper means forming a part of the elevator apparatus of the present invention.

A stack of trays including a track substantially fills the space of each chamber from floor to ceiling whereby the space between the ceiling and the uppermost tray is substantially the same as the space below the lowermost tray. The lowermost tray of a stack is supported by a truck having the same outer dimensions as the trays and supported on the track. The uniform division of the space in each chamber to be air-conditioned permits a uniform distribution of air. It is preferred that the floor or ceiling be provided with two horizontally disposed compartments which form the inlet and outlet conduits of the air-conditioning system. The inlet and outlet conduits of the air-conditioning system can thereby be arranged in a simple manner which is particularly advantageous in the construction and maintenance of the system.

The trays are preferably stacked on trucks which are movable on rails disposed in the chambers. The chambers may be of any desired length, but preferably are disposed in parallel and are of the same length but sufficiently long so as to accommodate a plurality of stacks of trays arranged in a row. In this manner, a large number of trays is accommodated in a relatively small space.

In accordance with the invention, the elevator apparatus and its gripping means are movable in a vertical direction and disposed for cycling the trays out of their chamber, through a work area, and then back into a chamber. In this manner, individual trays or even whole stacks of trays can be cycled through the working area and then back to their original chamber. In the working area, the trays may be subjected to planting, watering, harvesting, etc. The individual attention devoted to the trays can therefore be carried out with minimum labor since the trays are brought to the workers rather than the workers going to the trays.

In an operative embodiment using the present invention, chambers for storing the stacks of trays may be disposed above and/or below the location of the working area. In the working area, there is preferably provided a conveying apparatus such as a conveyor which cooperates with the gripping devices and elevator apparatus. A door or curtain may be provided for the inlet and outlet opening which permit access between the chambers and the working area. The entire system may be carried out in a manner which is substantially automatic so that only a small labor force is necessary.

For the purpose of illustrating the invention, there are shown in the drawings forms which are presently preferred; it being understood, however, that this invention is not limited to the precise arrangements and instrumentalities shown.

FIG. 2 is a vertical sectional view of a portion of the building in FIG. 1, illustrating the various chambers for growing plants to be serviced by and in accordance with the elevator apparatus of the present invention and taken along the line 2—2.

Figure 1:
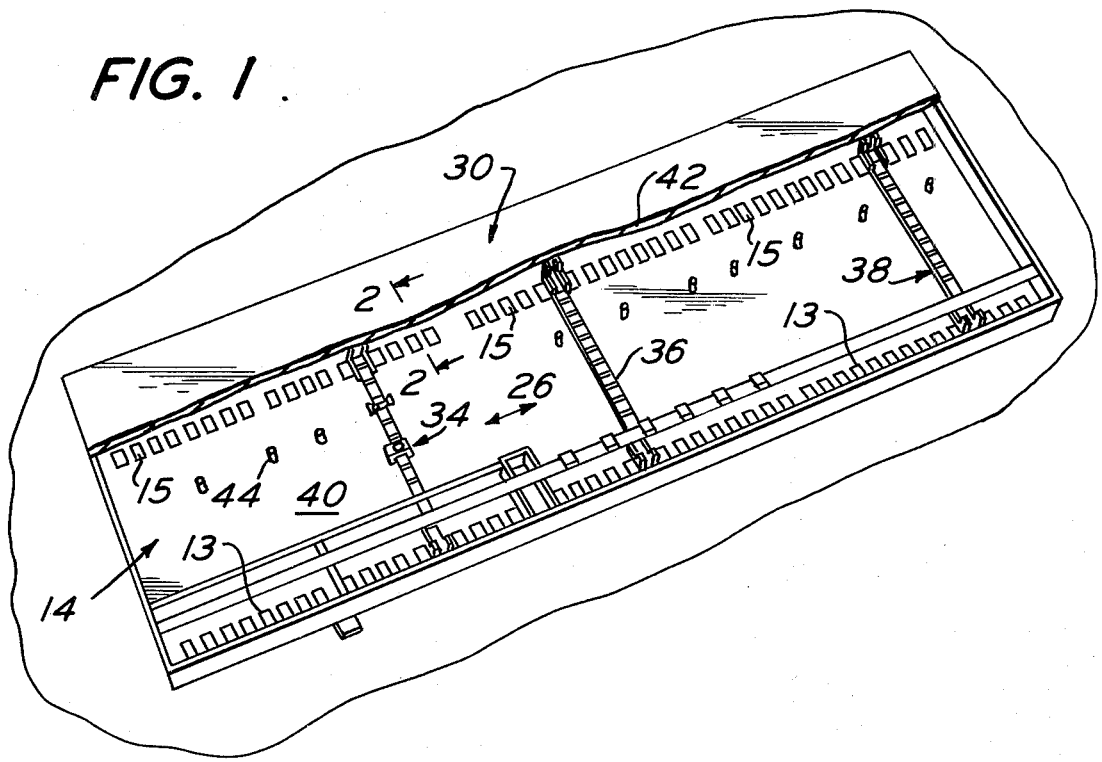
FIG. 1 is a perspective view of the working area in a multistory building incorporating the elevator apparatus of this invention.

Referring to the drawings wherein like numerals indicate like elements, there is shown apparatus in accordance with the present invention. Referring to FIG. 1, there is illustrated a multistory building 30 illustrated at the level of a room having a working area 14 which may be ground level. As illustrated, the length of the working area 14 may be sufficient so as to require a plurality of conveyors 34, 36, and 38. Each of the conveyors will service a plurality of channel-like chambers 7 therebelow. Access between each chamber and working area 14 is provided by way of the chamber inlet opening 13 and the chamber outlet opening 15 in the floor 40.

The ceiling for the working area 14 is identified as 42. Support columns 44 may be necessary and extend between the floor 40 and ceiling 42. In this event, the conveyors 34, 36, and 38 are constructed in a manner whereby they may be divided into sections so as to be able to continue to reciprocate back and forth in the horizontal direction of arrow 26 to facilitate cycling of stacks within the parallel channel-like chambers 7 therebelow.

Building 30 is provided with a plurality of parallel chambers 7 for the cultivation of plants such as mushrooms on a mass production type basis. Chambers 7 are disposed next to one another on a first elevation or level below the elevation of the working area 14. In addition, a plurality of channel-like chambers 7' are provided parallel to one another at an elevation which is above the elevation or level of the working area 14. At the ends of the chambers 7, outlet openings 15 are provided in a row in the floor 40 to facilitate cycling of the trays through the working area 14. The inlet openings 13 to each chamber 7 are likewise in rows in the floor 40 on the opposite side of the room.

The chambers 7' are parallel to the chambers 7 and have their outlet openings 16 disposed in a row in the ceiling 42. Each opening 16 is aligned with an opening 15. The inlet openings to the chambers 7', not shown, are arranged in a row over the openings 13. Thus, one elevator apparatus can receive trays from a conveyor in the working area 14 and transport them through the inlet openings to the chambers 7 or 7'. Another elevator removes the trays from the outlet openings 15 or 16 and feeds the trays to the conveyor. Since each elevator apparatus is identical, only elevator apparatus 19 associated with the chamber outlet opening will be discussed in detail hereinafter.

The receptacles or trays 2 are stacked one over the other with a uniform space therebetween on trucks 3 as shown in FIG. 2. The trucks 3 ride on tracks 4 which slope from the inlet opening 13 to the outlet opening 15. Due to the size and weight of the trays 2 and each truck 3, they are preferably removed one at a time and deposited on one end of a conveyor 34 by the elevator apparatus 19.

Figure 3:
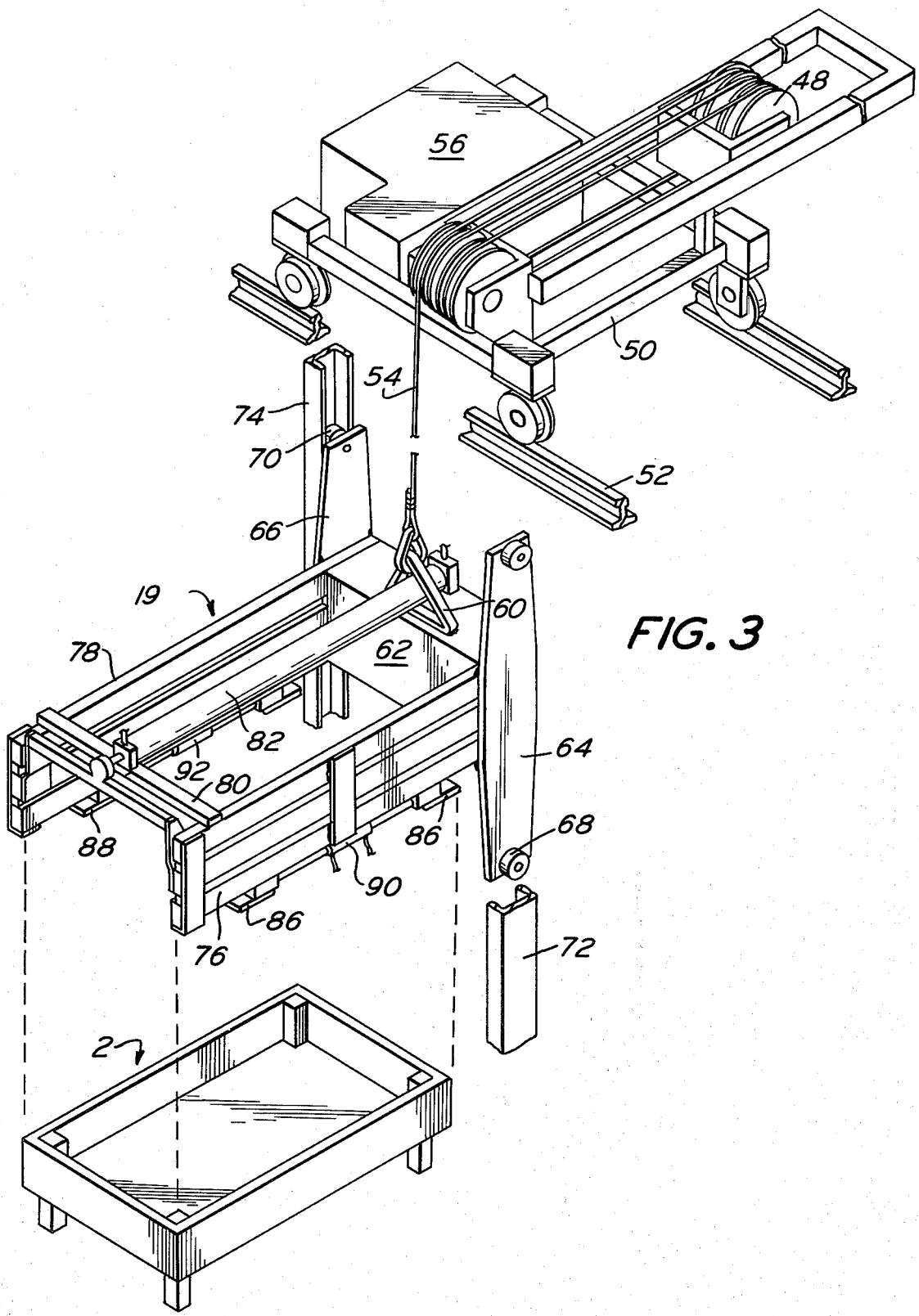
FIG. 3 is a perspective view of the elevator apparatus with its gripping means in its retracted position.

As shown in FIGS. 2 and 3, the roof 45 of the building 30 is provided with a longitudinally arranged roof extension 46. Within the extension 46, there is housed an elevator control means including a vehicle 50 supporting a plurality of reels 48 around which are wound a cable 54. The vehicle 50 is mounted on rails 52 so that it may move along the length of the building 30. Within a housing on the vehicle 50, there is provided a motor 56 for operating the winch reels 48 and causing the vehicle 50 to move along the rails 52.

The cable 54 is adapted to extend through a longitudinally extending slot 58. Slot 58 is disposed within the roof 45 and provides communication between the upper chambers 7' and the extension 46. Referring to FIG. 3, it will be noted that the cable 54 at its lower end terminates in a clasp which is releasably connected in any convenient manner to a hook 60 on the body or frame of the elevator apparatus 19. The body or frame of the elevator apparatus is U-shaped having arms 76 and 78 connected to a bight 62.

The elevator apparatus 19 includes upright guide plates 64 and 66. Plate 64 is provided with guide rollers 68 at each end and adapted to extend into the channel-like track 72. Plate 66 is provided with rollers 70 at each end which are adapted to extend into channel-like track 74.

Figure 4:
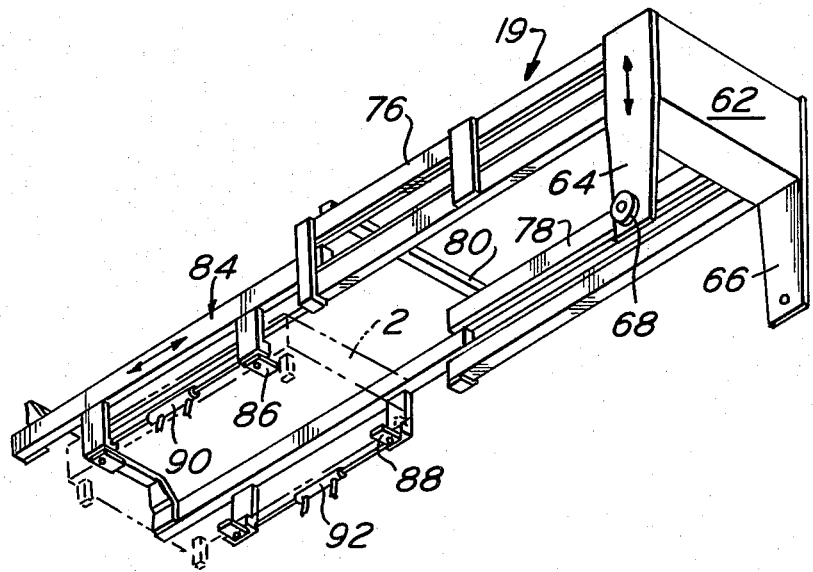
FIG. 4 is a bottom perspective view of the elevator apparatus with its gripping means in an extended position.

A cross brace 80 extends between the arms 76 and 78 of the body of the elevator apparatus 19. A cylinder 82 is supported by the cross brace 80 and the bight 62. Cylinder 82 is adapted to extend and retract the gripper means 84. In FIG. 3, the gripper means 84 is in its retracted position. In FIG. 4, the gripper means 84 is in its extended position.

The gripper means 84 is provided with a pair of pivotably mounted fingers 86 on one side and a pair of pivotably mounted fingers 88 on the other side. Cylinders 90 and 92 are supported by the gripper means for selectively causing the fingers to pivot from an aligned position as shown in FIG. 3 to a parallel position as shown in FIG. 4.

The cylinders 90 and 92 may cause the fingers 86 and 88 to pivot regardless of whether the gripper means 84 is in its extended or retracted position. In the position of the fingers 86 and 88 as illustrated in FIG. 3, the elevator apparatus 19 may descend downwardly and embrace the tray 2. Thereafter, actuation of the cylinders 90 and 92 will cause the fingers 86 and 88 to rotate 90° inwardly so as to extend below the tray 2, elevate the same upwardly through the opening 15 to a position between the guard rails 94. Guard rails 94 are fixedly secured to the conveyor 34 and to sections of the channel-like tracks 72 and 74 disposed between the floor 40 and ceiling 42. Thereafter, cylinder 82 may be actuated to deposit the elevated tray onto the conveyor 34. In like manner, the elevator apparatus on the other end of conveyor 34 removes the tray and returns it to its chamber.

Each of the chambers 7 and 7' are provided with stationary sets of channel-like tracks 75-corresponding to and adapted to be aligned with tracks 72 and 74. However, there are no channel-like tracks at the level of the working area except for tracks 72 and 74 supported at each end of each conveyor 34, 36, 38 by guard rails 94.

Each of the conveyors 34, 36 and 38 is provided with guard rails 94 at their ends. Each of the guard rails 94 is connected to and support the tracks 72 and 74 which are adapted to be aligned with selected ones of the sets of stationary tracks 75 in the respective chambers 7 and 7' which are serviced by the respective conveyors. In order that conveyor 34 may move horizontally in the direction of arrow 26, it is supported on the floor 40 by means of wheels 96 which rotate about axes parallel to the length of the conveyor 34. The frame of each conveyor includes rows of rubber wheels 98 at spaced points therealong for rotatably engaging the bottom surface of the trays and tracks.

In cycling the stacks of trays 2 from a particular chamber 7, through the working area 14, and back to the same chamber, the present invention enables this to be accomplished with a tray being outside of its chamber 7 for a period of only 5 to 6 minutes. When the conveyor 34 is to be moved from a position above or below a particular chamber 7 or 7' to an adjacent chamber, the body of elevator apparatus 19 is moved to a position between and supported by guard rails 94. Then the cable 54 is disconnected from the hook 60 and wound around the winch reels 48. Then vehicle 50 is moved to a position over the next chamber 7 or 7'. The tracks 72 and 74 as well as the elevator apparatus 19 move with the conveyor 34 and the guard rails 94 so as to be over or below the next chamber 7 or 7' to be cycled. Thereafter, the cable 54 is lowered and reconnected to the hook 60.

In a typical embodiment, the chambers 7 and 7' are 27 meters long, about 2 meters wide and about 4.3 meters high. The trays or receptacles 2 for growing mushrooms are each about 1.75 meters wide and occupy 2.43 square meters. Each chamber contains 140 trays (10 stacks of 14) with a total bed space of 340 square meters. The distance from side walls of chamber 7 to a side face of a stack will be about 5 inches which is also the preferred distance between trays 2. These figures are by way of example rather than being limitations.

Thus, it will be noted that we have disclosed a rugged elevator apparatus which is simple and yet is reliable for its intended purpose.

The present invention may be embodied in other specific forms without departing from the spirit or essential attributes thereof and, accordingly, reference should be made to the appended claims, rather than to the foregoing specification as indicating the scope of the invention.

We claim:

1. Apparatus comprising a multistory building having at least first and second elevations, said building including a horizontal floor between said elevations, said floor having spaced openings, said building at its first elevation having a plurality of parallel chambers each communicating with said second elevation by way of at least one of said spaced openings in said floor, a conveyor on the second elevation generally parallel to the chambers for processing items stored in the chambers, and an elevator frame for moving items between the first and second elevations, vertically disposed tracks, said elevator frame being guided for vertical movement by said tracks, said frame having a gripper means, motor means on said frame for moving said gripper means between an extended and retracted horizontal position, said gripper means including elements movably supported for movement from an inoperative retracted position to an operative extended position wherein the elements can embrace and support a receptacle in each of said positions and as the receptacle is moved vertically by the frame, said floor supporting the elevator frame for movement in a horizontal direction at said second elevation so that the frame may be juxtaposed to and enter through different ones of the openings in the floor between the first and second elevations, said conveyor being supported by said floor for movement in a transverse direction, guard rails, a portion of said tracks being connected to said guard rails and movable with the conveyor when the elevator frame is between the guard rails, said tracks include stationary portions at said first elevation in each chamber, and said movable portion of said tracks being adapted to be aligned with each set of stationary tracks.

2. Apparatus in accordance with claim 1 wherein said second elevation is above said first elevation, said building including a third elevation containing parallel chambers above said second elevation, each of the chambers in said third elevation being generally parallel to said conveyor, and means defining openings between the second and third elevations so that said elevator may be juxtaposed to and enter through the last-mentioned openings to move items between the third elevation and the second elevation.

3. Apparatus in accordance with claim 1 wherein the openings between the first and second elevations are in a row, said elevator and its tracks being movable parallel to said row.

4. Apparatus in accordance with claim 1 including a cable removably connected to said frame, a winch supported above said frame, said cable extending around said winch.

5. Apparatus in accordance with claim 4 including vehicle tracks, a vehicle supported on said vehicle tracks, said winch being mounted on said vehicle, said vehicle tracks extending in a direction generally parallel to the direction of horizontal movement of said elevator frame.

* * * * *